(12) United States Patent
Berg et al.

(10) Patent No.: US 6,448,371 B1
(45) Date of Patent: Sep. 10, 2002

(54) PROCESS FOR THE PURIFICATION OF ALDEHYDE IMPURITIES

(75) Inventors: Mats Berg; Alf Djurle, both of Rönninge; Magnus Melin, Södertälje; Peter Nyman, Nykvarn, all of (SE)

(73) Assignee: Maillefer Instruments Trading S.a.r.l. (CH)

( * ) Notice: Subject to any disclaimer, the term of this patent is extended or adjusted under 35 U.S.C. 154(b) by 39 days.

(21) Appl. No.: 09/656,036

(22) Filed: Sep. 8, 2000

(51) Int. Cl.⁷ .............................. C08F 6/10; C08G 65/30
(52) U.S. Cl. .............................. 528/486; 422/5; 516/76; 528/421; 568/613; 568/621
(58) Field of Search .............................. 516/76, 99, 920; 568/621, 601, 613; 528/421, 486; 422/5

(56) References Cited

U.S. PATENT DOCUMENTS

| | | | |
|---|---|---|---|
| 3,036,130 A | * 5/1962 | Jackson et al. | ............ 516/76 X |
| 3,462,379 A | * 8/1969 | Gurgiolo et al. | ............ 528/486 |
| 3,546,321 A | * 12/1970 | Jabloner et al. | ............ 516/76 X |
| 3,639,574 A | * 2/1972 | Schmolka | ................ 516/76 X |
| 3,674,502 A | * 7/1972 | Honey et al. | ............. 516/76 X |
| 3,715,402 A | * 2/1973 | Louvar et al. | |
| 4,143,072 A | * 3/1979 | Hetzel et al. | ............ 568/613 X |
| 4,322,312 A | * 3/1982 | Boehmke | .................. 516/76 X |
| 4,410,447 A | * 10/1983 | Decker et al. | .......... 516/920 X |
| 4,606,918 A | * 8/1986 | Allison et al. | ............ 516/76 X |
| 5,012,013 A | * 4/1991 | Wimmer et al. | ............ 568/621 |
| 5,342,541 A | 8/1994 | Chavez et al. | ......... 252/182.27 |
| 5,545,712 A | * 8/1996 | Tsutsui et al. | .......... 528/421 X |
| 5,962,748 A | * 10/1999 | Lambert | ................ 568/621 X |
| 6,166,266 A | * 12/2000 | Hagen et al. | ............... 568/613 |

FOREIGN PATENT DOCUMENTS

| | | |
|---|---|---|
| EP | 0398684 | 11/1990 |
| EP | 0466150 | 1/1992 |
| EP | 0591817 | 4/1994 |

* cited by examiner

*Primary Examiner*—Richard D. Lovering
(74) *Attorney, Agent, or Firm*—James B. Bieber

(57) ABSTRACT

A novel process for the purification of poloxamers which contain aldehyde impurities, and particularly for the purification of the poloxamers named poloxamer 188 and poloxamer 407, which process includes dissolving the poloxamer(s) in a solvent which solvent may optionally contain an acid or a mixture of acids; if the solvent in which the poloxamer(s) has been dissolved is free from acid, acid is added; whereafter the aldehydes are removed.

20 Claims, No Drawings

PROCESS FOR THE PURIFICATION OF ALDEHYDE IMPURITIES

CROSS REFERENCE TO RELATED APPLICATIONS

The present application represents U.S. national stage of international application PCT/SE00/01305 with an international filing date of Jun. 19, 2000. The international application claims priority to Swedish application 9902364-0, filed on Jun. 21, 1999.

FIELD OF THE INVENTION

The present invention relates to a novel process for the purification of poloxamers which contain aldehyde impurities, and particularly for the purification of the poloxamers named poloxamer 188 and poloxamer 407.

BACKGROUND OF THE INVENTION

Poloxamers are synthetic block copolymers of hydrophilic ethylene oxide chains and hydrophobic propylene oxide chains, having the formula HO—$[C_2H_4O]_a$—$[C_3H_6O]_b$—$[C_2H_4O]_a$—H, wherein a and b represent the number of hydrophilic and hydrophobic chains respectively.

The poloxamers can be used as surfactants, emulsifying agents, solubilizing agents or wetting agents in different compositions. WO97/38675 discloses a composition comprising one or more local anaesthetics, water and one or more surfactants, preferably poloxamer(s). Since the poloxamers have both hydrophobic and hydrophilic domains they can, in combination with for example a local anaesthetic, provide a composition having thermoreversible gelling properties.

Commercially available poloxamers often contain relatively high amounts of aldehydes. These aldehydes may react with the active compound, for example a local anaesthetic, and form non-desirable compounds which have to be separated from the final product. This also means that a higher amount of the active compound is required, since some of the active compound is reacting with the aldehydes and thus is lost during the purification process.

Thus, there is a need for an improved purification process in order to reduce the concentration of aldehydes in poloxamers.

OUTLINE OF THE INVENTION

The present invention is directed to a novel process for the purification of poloxamers, which contain aldehyde impurities, whereby (i) the poloxamer(s) is dissolved in a solvent, which solvent may optionally contain an acid or a mixture of acids, (ii) if the solvent in which the poloxamer(s) has been dissolved is free from acid, acid is added; whereafter (iii) the aldehydes are removed.

The process according to the present invention is suitable for the purification of poloxamers containing aldehyde impurities, said poloxamers having the general formula HO—$[C_2H_4O]_a$—$[C_3H_6O]_b$—$[C_2H_4O]_a$—H, wherein a and b represent the number of hydrophilic and hydrophobic chains. The process according to the present invention is particularly suitable for the purification of Lutrol F68®, which also has the name poloxamer 188 and wherein a=80 and b=27, or Lutrol F127®, which also has the name poloxamer 407 and wherein a=101 and b=56, the definitions being in accordance with USP (1995) HF18, p.2279. The process may also be used for the purification of a mixture of poloxamers, and specifically a mixture of poloxamer 188 and poloxamer 407, as well as for the purification of other polymers containing monomers such as ethylene oxide, propylene oxide or similar, said polymers containing aldehyde impurities.

The solvent used for dissolving the poloxamer may be water, an alcohol such as methanol. ethanol or propanol, or any other suitable solvent. Preferably water is used as a solvent.

The temperature of the solvent or the mixture of solvent and poloxamer is not essential, however, the poloxamer is dissolved more quickly at a temperature below room temperature. A preferred solvent temperature is from 0 to +10° C.

The concentration of poloxamer in the poloxamer solution is preferably 5–21% by weight.

More preferred the concentration is 15% by weight.

The acid(s) added to the poloxamer solution may be any acid(s), but preferably one or a mixture of two or more of hydrochloric acid, acetic acid or citric acid. More preferably the acid is one or a mixture of hydrochloric acid or acetic acid, but most preferred is to use acetic acid alone. pH for the solution after having added the acid should be from 1–7, preferably from 1–5. The amount of added acid is dependent on the desired pH.

The acid or acids may be added to the solvent before or after the poloxamer is added to the solvent. When the poloxamer and the acid have been added to the solvent, and the poloxamer is dissolved, the acid needs some time to interact, whereafter the aldehydes are removed from the solution by drying. The drying may be evaporation performed by boiling the solution, whereby the aldehydes are vaporized, drying the solution on a fluid bed, spray drying, freeze drying, vacuum evaporation or letting a stream of gas, such as helium or nitrogen, pass through the solution, spray crystallisation, spray granulation or any other method of drying known to the skilled person. Preferably the aldehydes are evaporated by drying the solution on a fluid bed and at a temperature as of <47° C. for the poloxamer. A higher temperature provides a quicker drying of the solution, but the temperature may however not be too high since the poloxamers may melt at higher temperatures.

The process according to present invention is particularly suitable for the removal of formaldehyde, acetaldehyde and propionaldehyde from poloxamers. Other aldehyde impurities may however also be removed by using the process according to the present invention. The present process is particularly suitable for the removal of acetaldehyde and propionaldehyde from poloxamers.

Also within the scope of the invention is a poloxamer purified from aldehydes according to the process described above.

DETAILED DESCRIPTION OF THE INVENTION

The reduction of aldehydes in the following Examples has been determined according to the analytical method described below.

Analytical Method

The sample is dissolved and diluted in water. Any aldehydes present in the poloxamers will react with 2,4-dinitrophenylhydrazine or 3-methyl-2-benzothiazolonehydrazone at room temperature to form derivatives. The derivatives are extracted with cyclohexane followed by evaporation of the organic phase. The residual is dissolved in the mobile phase and the derivates are separated using liquid chromatography and quantified by standard addition or external standard calibration.

The invention will now be described more in detail by the following non-limiting examples.

EXAMPLE 1
Purging with Helium

HCl was added to water to a concentration of 0.3 mol/l. Poloxamer 407 was dissolved in the HCl solution to a concentration of 5% by weight (w/w). The solution was purged with helium for 2 hours and kept at room temperature over night. The solution was then purged with helium for an additional 3 hours. The solution was kept at room temperature and helium was added at a flow of 1 bubble/second. The amount of aldehydes was reduced by 80%.

EXAMPLE 2
Evaporation by Using Nitrogen

HCl was added to water to a concentration of 0.3 mol/l. Poloxamer 407 was dissolved in the HCl solution to a concentration of 5% by weight (w/w). The solution was kept at room temperature for 3 hours. 80% of the solution was evaporated by using nitrogen flow. 0.3 mol/l HCl solution was added to the initial volume. The amount of aldehydes was reduced by 95%.

EXAMPLE 3
Vacuum Evaporation 5.5% w/w Poloxamer 188 and 15.5% w/w poloxamer 407 were dissolved in water. Citric acid was added to pH 2.7 whereafter the solution was kept at room temperature for at least 24 hours. Then 5% by weight of the solution was evaporated by using a rotavapour. The concentration of acetaldehyde was decreased from 135 ppm to 30 ppm and the concentration of propionaldehyde was decreased from 429 ppm to <10 ppm.

EXAMPLE 4
Fluid Bed Drying—Hydrochloric Acid

Poloxamer 407 was dissolved in water to a concentration of 15% w/w, whereafter hydrochloric acid was added to pH 2. The solution was kept in a refrigerator for 6 days. The solution was dried by using fluid bed drying. The concentration of acetaldehyde was decreased from 337 ppm to 26 ppm and the propionaldehyde level was decreased from $1.35*10^3$ ppm to 76 ppm.

EXAMPLE 5
Fluid Bed Drying—Citric Acid 18.22 g Citric acid, having a concentration of 50%, was added to 2000 g of water. Poloxamer 407 was dissolved in the citric acid solution to a concentration of 15% w/w. The solution was kept in a refrigerator for 6 days. The solution was dried in a fluid bed. The concentration of acetaldehyde and propionaldehyde was decreased from 358 ppm to 5 ppm and from $1.39*10^3$ ppm to <6 ppm respectively.

EXAMPLE 6
Fluid Bed Drying—Acetic Acid (Poloxamer 188)

120 g Concentrated acetic acid was added to 2000 g of water. Poloxamer 188 was dissolved in the acetic acid solution to a concentration of 15% w/w. The solution was kept in a refrigerator for 6 days. The solution was dried in a fluid bed. The concentration of acetaldehyde was decreased from 186 ppm to 8 ppm and the concentration of propionaldehyde from 297 ppm to <6 ppm.

EXAMPLE 7
Fluid Bed Drying—Acetic Acid (Poloxamer 407)

120 g Concentrated acetic acid was added to 2000 g of water. Poloxamer 407 was dissolved in the acetic acid solution to a concentration of 15% w/w. The solution was kept in a refrigerator for 6 days. The solution was dried in a fluid bed, whereby the concentration of acetaldehyde was decreased from 358 ppm to 12 ppm and the concentration of propionaldehyde from $1.39*10^3$ ppm to 9 ppm.

EXAMPLES 8–10
Purification of Poloxamer 188 in Full Scale

The poloxamer was dissolved in water, whereafter acetic acid was added. After at least 24 hours interaction, the solution was dried using a fluid bed dryer. In order to speed up the process, purified poloxamer was used as starting material in the fluid bed dryer. The first batch was however produced without purified poloxamer as starting material. In the following examples material from the previous batch was used as starting material.

Equipment and Process Parameters

| | |
|---|---|
| Fluid Bed Dryer: | Glatt GVW 32" |
| Filter Shaking: | 2015 |
| Spray Nozzle: | 1 * 6 head, central, 1.8 mm |
| Spray Nozzle Position: | 4 v down |
| Pump: | Membrane-Pump |

| Process Parameter | Poloxamer 188 (Examples 8–10) |
|---|---|
| Water | 135 kg |
| Acetic Acid | 15 kg |
| Poloxamer | 100 kg |
| PH | <2.8 |
| Interaction Time | >24 h < 1 week |
| Starting Material | 100 kg |
| Inlet Air Flow | 4000–5000 m³ |
| Inlet Air Temperature | 48–52° C. |
| Product Temperature | <47° C. |
| Spray Pressure | 3.8–4.2 bar |
| Spray Flow | 500–600 g/min |

Analytical Results

3 Batches of Poloxamer 188 were purified according to the process with the process parameters given above. The levels of aldehydes are presented in the table below.

| Batch | Formaldehyde µg/g | Acetaldehyde µg/g | Propionaldehyde µg/g |
|---|---|---|---|
| Poloxamer 188 | 3.8 | $1.4 * 10^2$ | $2.8 * 10^2$ |
| Example 8 Poloxamer 188 | <1.9 | <20 | <48 |
| Example 9 Poloxamer 188 | <1.9 | <20 | <48 |
| Example 10 Poloxamer 188 | <1.9 | <20 | <48 |

EXAMPLES 11–13
Purification of Poloxamer 407 in Full Scale

The poloxamer was dissolved in water, whereafter acetic acid was added. After at least 24 hours interaction, the solution was dried using a fluid bed dryer. In order to speed up the process, purified poloxamer was used as starting material in the fluid bed dryer. The first batch was however produced without purified poloxamer as starting material. In the following examples material from the previous batch was used as starting material.

Equipment and Process Parameters

| Fluid Bed Dryer: | Glatt GVW 32" |
|---|---|
| Filter Shaking: | 2015 |
| Spray Nozzle: | 1 * 6 head, central, 1.8 mm |
| Spray Nozzle Position: | 4 v down |
| Pump: | Membrane-Pump |

| Process Parameter | Poloxamer 407 (Examples 11–13) |
|---|---|
| Water | 592.1 kg |
| Acetic Acid | 47.4 kg |
| Poloxamer | 150 kg |
| PH | <2.8 |
| Interaction Time | >24 h < 1 week |
| Starting Material | 50 kg |
| Inlet Air Flow | 4000–5000 m$^3$ |
| Inlet Air Temperature | 48–52° C. |
| Product Temperature | <47° C. |
| Spray Pressure | 3.8–4.2 bar |
| Spray Flow | 700–900 g/min |

Analytical Results

3 Batches of Poloxamer 407 were purified according to the process with the process parameters given above. The levels of aldehydes are presented in the table below.

| Batch | Formaldehyde µg/g | Acetaldehyde µg/g | Propionaldehyde µg/g |
|---|---|---|---|
| Poloxamer 407 | 5.2 | 3.0 * 10$^2$ | 1.3 * 10$^3$ |
| Example 11 Poloxamer 407 | <1.9 | <20 | <48 |
| Example 12 Poloxamer 407 | 2.1 | <20 | <48 |
| Example 13 Poloxamer 407 | <1.9 | <20 | <48 |

The examples show that by using the process according to present invention the concentrations of aldehydes, specifically acetaldehyde and propionaldehyde. are reduced in both poloxamers 407 and 188. Further it has been shown that all the acids hydrocloric acid, acetic acid and citric acid can be used in the present process. Furthermore the examples also show that drying of the solution may be performed in many different ways, such as purging with helium, evaporation by using nitrogen, vacuum evaporation or fluid bed drying.

What is claimed is:

1. A process for the purification of poloxamers which contain aldehyde impurities said poloxamers having the formula HO—[C$_2$H$_4$O]$_a$—[C$_3$H$_6$O]$_b$—[C$_2$H$_4$O]$_a$—H wherein a and b are the number of hydrophilic and hydrophobic chains respectively, whereby
   (i) the poloxamer(s) is dissolved in a solvent, which solvent may optionally contain an acid or a mixture of acids,
   (ii) if the solvent in which the poloxamer(s) has been dissolved is free from acid, acid is added; whereafter
   (iii) the aldehydes are removed by vaporizing at less than the melting temperature of said poloxamers.

2. A process according to claim 1 wherein the poloxamer is one of a=80 and b=27 or a=101 and b=56, or a mixture thereof.

3. A process according to claim 1 wherein the solvent is water or an alcohol.

4. A process according to claim 3 wherein the solvent is water.

5. A process according to claim 1 wherein the concentration of the poloxamer dissolved in the solvent is 5–21% by weight.

6. A process according to claim 5 wherein the concentration of the poloxamer is 15% by weight.

7. A process according to claim 1 wherein the temperature of the mixture of the solvent and the poloxamer is below room temperature.

8. A process according to claim 7 wherein the temperature of the mixture is from 0 to +10° C.

9. A process according to claim 1 wherein the acid is selected from the group consisting of hydrochloric acid, acetic acid and citric acid.

10. A process according to claim 9 wherein the acid is acetic acid.

11. A process according to claim 1 wherein the pH is 1–7 after adding the acid to the solution.

12. A process according to claim 11 wherein the pH is 1.3–6.

13. A process according to claim 1 wherein the aldehydes are removed by letting a stream of helium or nitrogen pass through the solution.

14. A process according to claim 1 wherein the aldehydes are removed by vacuum evaporation.

15. A process according to claim 1 wherein the aldehydes are removed by fluid bed drying.

16. A process according to claim 1 wherein the aldehydes are removed by boiling the solution.

17. A process according to claim 1 wherein the aldehydes removed are formaldehyde, acetaldehyde or propionaldehyde.

18. A poloxamer purified from aldehydes according to the process described in claim 1.

19. A process for the purification of poloxamers of aldehyde impurities, comprising:
   (i) dissolving the poloxamers in a solvent, which solvent may optionally contain an acid or a mixture of acids;
   (ii) adding acid where the solvent is free from acid;
   (iii) reacting said poloxamers and acid solution at about room or lower temperature; and
   (iv) removing said impurities by evaporating said solvent below the melting temperature of said poloxamers.

20. A process according to claim 19 wherein said evaporating step comprises fluid bed drying at below 47° C.

* * * * *